Figure 5:
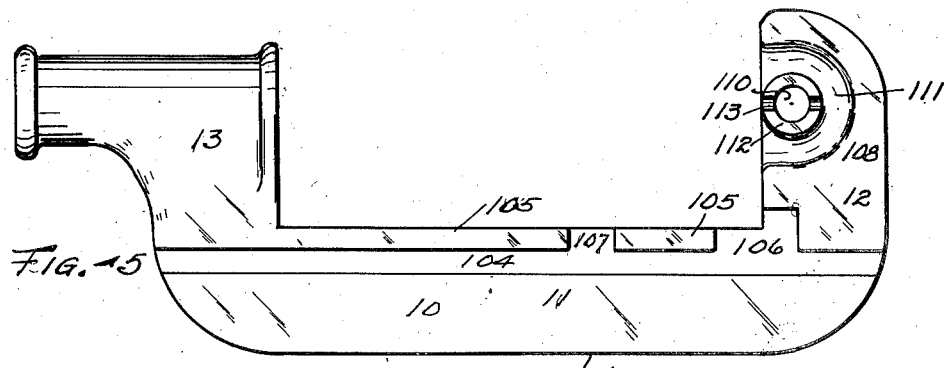

Aug. 7, 1934.  C. W. SHAFER  1,968,857
PIPE CUTTER
Filed March 23, 1933   2 Sheets-Sheet 1
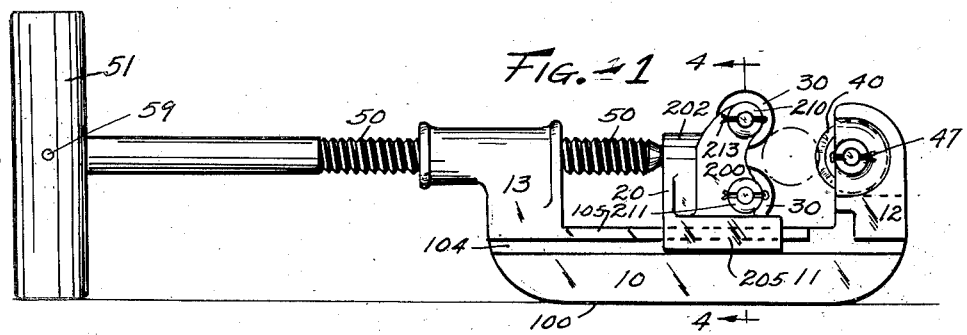
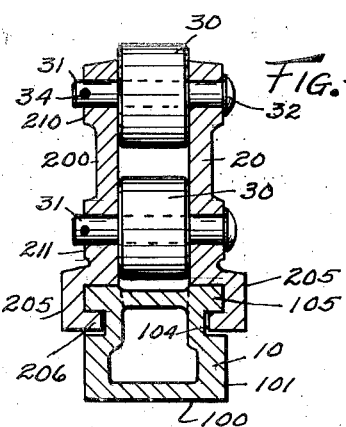
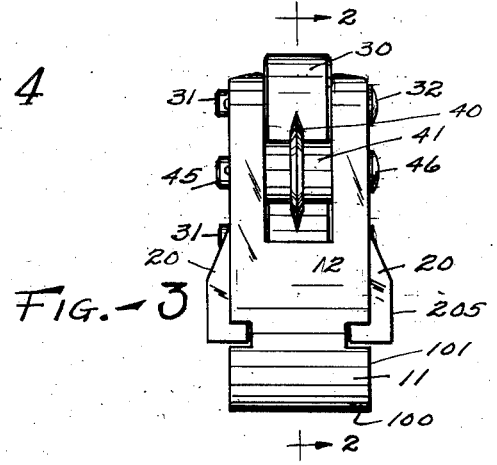
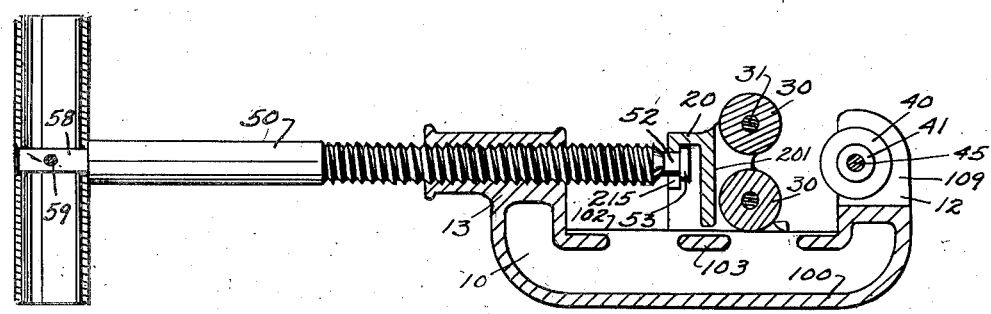
Inventor
Clarence W. Shafer,
By Bates, Golrick Fearn
Attorneys Aug. 7, 1934.  C. W. SHAFER  1,968,857
PIPE CUTTER
Filed March 23, 1933  2 Sheets-Sheet 2

Inventor
Clarence W. Shafer
By Bates, Goldrick & Fears
Attorneys.

Patented Aug. 7, 1934

1,968,857

UNITED STATES PATENT OFFICE 1,968,857

PIPE CUTTER

Clarence W. Shafer, Warren, Ohio, assignor to The Borden Company, Warren, Ohio, a corporation of Ohio Application March 23, 1933, Serial No. 662,258

1 Claim. (Cl. 81—192)

This invention relates to a pipe cutter of the type having a frame carrying a rotary cutting wheel; a block slidably mounted on the frame and carrying a pair of spaced rollers to oppose the cutter; a rod screw threaded in the frame and having its inner end rotatably engaging the block, a handle at the outer end of the rod serving the double purpose of revolving the tool about the pipe and of axially rotating the rod to feed the cutting wheel into the pipe.

Pipe cutters of the type specified have been on the market for many years, put out by a number of manufacturers, including my assignee, but I believe it has been the universal experience with such cutters that it is extremely difficult to insure accuracy of manufacture. The result is that in actual use many of the pipe cutters will not operate satisfactorily, because the cutting wheel does not take a perfectly circular course about the pipe, at right angles to the axis thereof, but on the contrary cuts a helical course. I have found by experience that such inaccurate operation is likely to result from the use of pipe cutters which, so far as appearances go, are exactly like pipe cutters which have operated satisfactorily.

After much experimenting, I have found that the difficulty with existing pipe cutters of the type mentioned has arisen largely because the usual frame of such pipe cutter does not adapt itself to accurate manufacture. In view of that situation, I have designed the pipe cutter shown in the drawings hereof, and hereinafter more fully described, which, by reason of the particular shape of the frame, is adapted for accurate machining and enables the production of tools uniformly satisfactory in operation.

My invention, therefore, may be summarized as comprising a pipe cutter of the type described, having the frame of the form shown in the drawings hereof and hereinafter more fully explained. The particular form of sliding block shown is also of value in enabling accurate cooperation between the block and frame.

Figure 6:
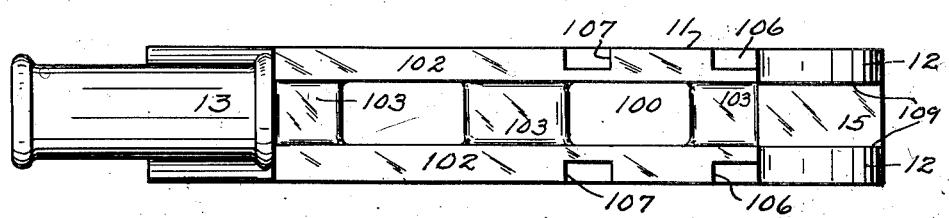
Figure 7:
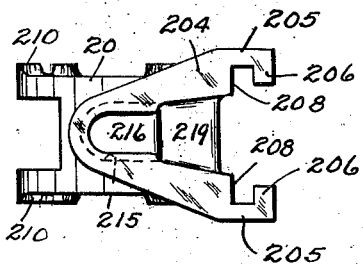
Figure 8:
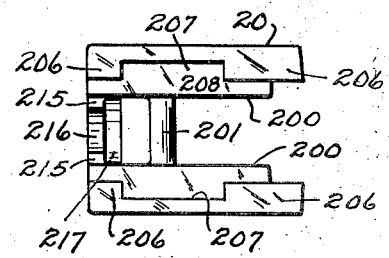

In the drawings, Fig. 1 is a side elevation of my improved pipe cutter. Fig. 2 is a longitudinal section thereof in a plane parallel with Fig. 1. Fig. 3 is an end view of the pipe cutter on a larger scale. Fig. 4 is a vertical section through the sliding block and frame, as indicated by the line 4—4 on Fig. 1, this view being on the same scale as Fig. 3. Fig. 5 is a side elevation of the frame alone. Fig. 6 is a plan thereof. Fig. 7 is a rear elevation of the sliding block alone. Fig. 8 is a bottom plan of the sliding block.

As usual, the frame 10 has a body or a base portion 11, at one end of which is an integral standard 12 carrying the cutter wheel 40, and the other end of which is a standard 13 formed into an internally threaded sleeve parallel with the base 11. Slidable on the base is the block 20 which carries a pair of rollers 30 or a pair of rotary knives, as desired, to cooperate with the cutting wheel 40. This block is slidably guided on the base 11. The feeding and operating handle comprises a rod 50 threaded in the standard 13 and rotatively connected at its inner end to the sliding block 20 and having at its outer end a transverse handle 51 by which it may be rotated to cause the feed as the tool is being revolved about the pipe.

So much of the construction as above described is, broadly considered, old in pipe cutters. I will now describe specifically those features of the frame which enable the accuracy of manufacture mentioned.

The frame 10 is a hollow boat-shaped member having a flat bottom 100, side surfaces 101, at right angles to the bottom, and a top surface 102 at right angles to the sides, these top surfaces extending substantially continuously from the standard 12 to the standard 13. Below the top surfaces 102 are bridging members 103 connecting the two sides of the boat-like base.

Formed in each side-wall of the base is a longitudinal grove 104 with the base of the groove parallel with the side surfaces 101, while the side walls of the groove, particularly the upper wall, are parallel with the top surface 102. These grooves 104 extend throughout the entire length of the base, which enables their convenient and accurate machining. Each groove leaves between it and the top surface 102 a portion of the wall forming a rib 105 with a parallel top and bottom surface and an outside surface at right angles to the top and bottom surface. This rib is cut away by two openings, namely, the opening 106 adjacent the standard 12, which removes not only the end portion of the rib but a portion of the standard opposite the rib, and at some distance above it, as shown in Figs. 1 and 5. The other opening 107 is some distance back from the standard 12.

The standard 12, which is shown as carrying the cutting wheel 40, extends upwardly at right angles to the top surfaces 102. This standard has its outer facing 108 in the same plane as the side surfaces 101. The cutter opening 15 is cut clear through the standard, leaving the bifurcated standard with inner side walls 109 parallel with the outer surfaces. By making the cutter-wheel recess in the standard 12, in the form of an open notch, not only is the machining more simply and accurately effected, but removal and replacement of the cutter wheel from time to time may be more readily effected, and the cutter may be more readily cleaned.

Transverse aligned openings 110 in the two walls of the standard 12 are snugly occupied by a transverse pin 45 on which the cutter wheel 40 is journalled, with its hubs 41 abutting the inner walls 109. The pin preferably has a head 46 on one end, which abuts the outer face of the standard on that side and at the other end the pin receives a cotter pin 47.

On opposite sides of the standard 12, I form U-shaped grooves 111, the curve of which is a semi-circle concentric about the axis of the openings 110. These grooves lighten the construction but leave in effect bosses 112 about the cutter wheel pin to provide a proper support, the outer face of these bosses being in the same plane as the sides of the standard. On the side where the cotter pin is to come, the boss 112 is cut away by horizontal grooves 113 to receive the pin. When this pin is in place, its projecting legs occupy the U-shaped groove, and such projecting legs may be bent outwardly for a considerable distance in the groove and thus do not extend beyond the general side surface of the standard.

The frame described is preferably a single integral casting. As cast, its outer side surfaces not only of the base portion but of the standard 12, are as nearly parallel as may be in a casting. Now one of these surfaces is machined or ground to make it smooth and in a single plane, and the groove 104 is machined in the exposed side with its walls at right angles to the trued surface. Then the frame is turned over and with the body resting on the finished side and clamped in place, the opposite side is machined or ground truly parallel with the first side, and the groove is cut accurately on this second face. Then with the base clamped between truly parallel members engaging the two sides, the flat seat 102 at the top of the side walls is ground or machined truly at right angles to the two surfaces and the slot through the standard 12 is machined or ground with the inner faces truly parallel and at right angles to the surfaces 102.

It will be seen that the guiding surface 102 of the body is accurately at right angles to the two side surfaces; that the under-face of the ribs provided at the top of the side grooves is accurately parallel with the surface 102, while the side walls of those ribs are accurately parallel with each other and at right angles to the surface 102. The top surface 101, the outer sides of the ribs 105, and the lower surface of such ribs provided by the grooves 104 coact with finished surfaces on the block 20, as hereinafter described, to enable the block to be guided with precision along the frame.

The sliding block 20 is made of the form shown in Figs. 1, 4, 7 and 8. It is a single integral casting having a pair of vertical plate portions 200, connected by a transverse partition 201, beyond which is an arch-shaped portion 202. The arch-shaped portion connects at its forward end with the plate portions and the transverse partition and at its rear end has an end wall 204, which flares outwardly in the form of a transverse web. The side walls and arch and this transverse web all joint with the lower longitudinal walls 205 on the base of which are inwardly projecting ribs 206, separated by an open space 207. The lower ends of the walls 200 and the arch are machined off flat in the form of a purely horizontal plane 208. The inner surface of the walls 205 is machined at right angles to the surface 208 and the top of the ribs is parallel with the surface 208, while the inner surfaces of these ribs are at right angles to their tops.

The side walls 200 are formed with bosses 210 and 211 at their outer side through which are openings which carry pins 31, supporting the rollers 30. The rollers have a width sufficient to substantially take up the space between the parallel inner surfaces of the side walls 200. The pins 31 may have heads 32 on one side and on the other side receive cotter pins 34, which occupy grooves 213 formed in the bosses 210, 211 on that side.

The web portion 204 at the rear end of the sliding block 20 is formed to extend inwardly beyond the inner walls of the arch, as shown at 215. An opening 216 is made through this end wall, but it is smaller than the cavity 217 (Fig. 8) directly beyond it, with the result that a substantially U-shaped rib is provided by the end wall. This rib is adapted to coact with a groove in the handle rod, while a thickened portion of the partition 201 forms an abutment for a head at the inner end of the handle rod, the handle rod having near its inner end a groove 52 beyond which is a head 53 at the extreme end of the screw. The block may be put in place over this head, the head occupying the recess 217 and the shank of the rod at the groove occupying the reduced opening 216. This rotatably connects the screw with the block.

As the block surfaces 208, which rest on the frame guide 102 are accurately machined, and as the inner surface of the walls 205, which coact with the outer face of the frame ribs 105, are accurately formed at right angles to the surface 208, and as the top surface of the inwardly projecting ribs of the block side walls 206 are accurately at right angles to the side surfaces 205, and engage the underside of the frame ribs with just sliding clearance, it follows that the block is slidably guided accurately along the base to present its rollers in exact axial parallelism with the axis of the cutter, so that in use, the tool will truly cut at right angles to the pipe and not produce the troublesome spiral cutting.

The parts are assembled before the rollers have been mounted in the block 20. The block is placed in the general space above the base of the frame adjacent the standard 12; the projecting front portion of the side walls 205 is passed over the outer faces of the standard 12 with the projecting portion of the block ribs occupying the opening 106, the block being held in an inclined position tipped toward the standard. The handle screw 50 is turned into the standard 13 until the head 53 enters the comparatively wide opening 219 in the block and is beyond the U-shaped rib 215. Then the block is tipped down into a horizontal position, causing the rib 215 to enter the handle rod groove 52. This brings the rib portions 206 of the block directly over the openings 106 and 107 through the rib portion of the body. Then the block is shoved downwardly into place and drawn rearwardly by turning out the screw. This causes the rib portions on the block to stand beneath ribbed portions on the frame, so that the block is slidably guided while the screw is rotatably attached to the block.

When the block is withdrawn a short distance from the standard 12 the rollers 30 are put in place and the pins passed through them and secured by cotter pins. The cutter wheel 40 may be put in place either before or after the block is located. When the cutter and wheels are in place they prevent the block approaching the standard 12 sufficiently to bring the block ribs into registration with the openings through the body ribs. Accordingly, the block is slidably retained on its guide on the frame.

The hand grip 51 on the handle rod 50 is preferably a tube through which a reduced shank 58 on the handle rod extends. The end of this shank may be upset in the outer wall of the tube and a transverse pin 59 may pass through the tube and through the shank.

It will be noticed from Figs. 1 and 2 that the length of the handle grip is substantially twice the distance from the axis of the cutter rod to the base of the frame 10, with the result that the tool is adapted for standing in a horizontal position on a bench or other support, resting on the flat bottom of the frame and the end of the handle, as shown in Figs. 1 and 2. This enables the tool to be very conveniently handled for changing the cutters or rolls, as desired.

The continuing of the body below the grooves in the form of a wide flat portion in the same plane with the rib portion of the sides and with the standard, as stated, provides for accurately holding the body during the machining or grinding of the surfaces to insure the necessary right angle faces. Experience has demonstrated that with the frame formed as described, and ground or machined, the accuracy is such that the tool is certain to "track"—whether it have one cutting wheel or three—and the troublesome spiral cut is entirely avoided.

The particular form of frame, however, has additional advantages besides its adaptation for accuracy of finishing. Thus, it provides a wide base for the pipe cutter, allowing it to stand upright, as shown in Fig. 1. It also enables the tool to be very readily clamped in a vise. This is of advantage where a pipe vise is not available and one wishes to cut off a pipe by rotating the pipe in a stationarily held cutter. Such operation may also be resorted to for cutting off very short pipe portions which cannot be readily grasped in a pipe vise.

From the description given, it will be apparent that my pipe cutter, due to the form of its frame as shown and specifically described, has advantages of accuracy and adaptability in service beyond the pipe cutters of the same general type now in use.

I claim:

A pipe cutter having a frame with a hollow base portion and standards at each end of said base portion, sides on said base portion, said sides having channels on the outside thereof extending lengthwise of said sides, each of said channels having a recess extending from said channel to the top of said base portion and a second recess at the junction of one of said standards with said sides, said second recess extending from said channel to the top of said base portion and partially underlying said standard to extend above the top of said base portion.

CLARENCE W. SHAFER.